(12) United States Patent
Lamparter et al.

(10) Patent No.: US 6,515,583 B1
(45) Date of Patent: Feb. 4, 2003

(54) VEHICLE SIGNAL LIGHT ASSEMBLY

(75) Inventors: Ronald C. Lamparter, Grosse PointeShores, MI (US); James A. Haigh, Shelby Township, MI (US); Richard J. Iminski, St. Claire Shores, MI (US)

(73) Assignee: Transpec, Inc., Sterling Heights, MI (US)

( * ) Notice: Subject to any disclaimer, the term of this patent is extended or adjusted under 35 U.S.C. 154(b) by 0 days.

(21) Appl. No.: 09/992,570

(22) Filed: Nov. 6, 2001

(51) Int. Cl.[7] .............................................. B60C 23/00
(52) U.S. Cl. ...................... 340/433; 340/464; 340/468; 340/815.45; 362/800
(58) Field of Search ................................ 340/433, 458, 340/459, 463, 464, 465, 469, 470, 471, 472, 482, 483, 485, 488, 489, 468, 815.45, 815.49; 362/800

(56) References Cited

U.S. PATENT DOCUMENTS

| | | | |
|---|---|---|---|
| 2,517,173 A | * 8/1950 | Blasingame | 177/327 |
| 2,851,674 A | * 9/1958 | Boone | 340/106 |
| 3,678,457 A | * 7/1972 | Lev | 340/468 |
| 4,298,869 A | * 11/1981 | Okuno | 257/88 |
| 4,654,629 A | * 3/1987 | Bezos et al. | 246/473.3 |
| 4,954,822 A | * 9/1990 | Borenstein | 340/925 |
| 5,073,768 A | 12/1991 | Willaredt | |
| 5,426,414 A | * 6/1995 | Flatin et al. | 116/28 R |
| 5,567,036 A | * 10/1996 | Theobald et al. | 362/80 |
| 5,604,480 A | * 2/1997 | Lamparter | 340/433 |
| 5,877,682 A | * 3/1999 | Groeller | 340/479 |
| 6,241,373 B1 | * 6/2001 | Kelley et al. | 362/184 |

OTHER PUBLICATIONS

Electric Service Supplies Company Sheet 128C, 128C–1 Jul. 21, 1932.

* cited by examiner

*Primary Examiner*—Daniel J. Wu
*Assistant Examiner*—Son Tang
(74) *Attorney, Agent, or Firm*—Reising, Ethington, Barnes, Kisselle, Learman & McCulloch, PC

(57) ABSTRACT

A bus has three examples of a vehicle signal light assembly. Each assembly includes a housing base with a perimeter wall defining a cavity. The cavity includes an end portion set off by a partition in the cavity. Separate circuit boards are disposed in the end portion and the remaining portion of the cavity. Each circuit board has an array of LEDs that convey a message. One circuit board can be positioned in the end cavity portion in at least two different orientations. The end portion of the cavity and the one circuit board are preferably octagonal in shape to accommodate several orientations of a circuit board having arrays of LEDs arranged in symbols such as an arrow or a stop sign.

13 Claims, 4 Drawing Sheets

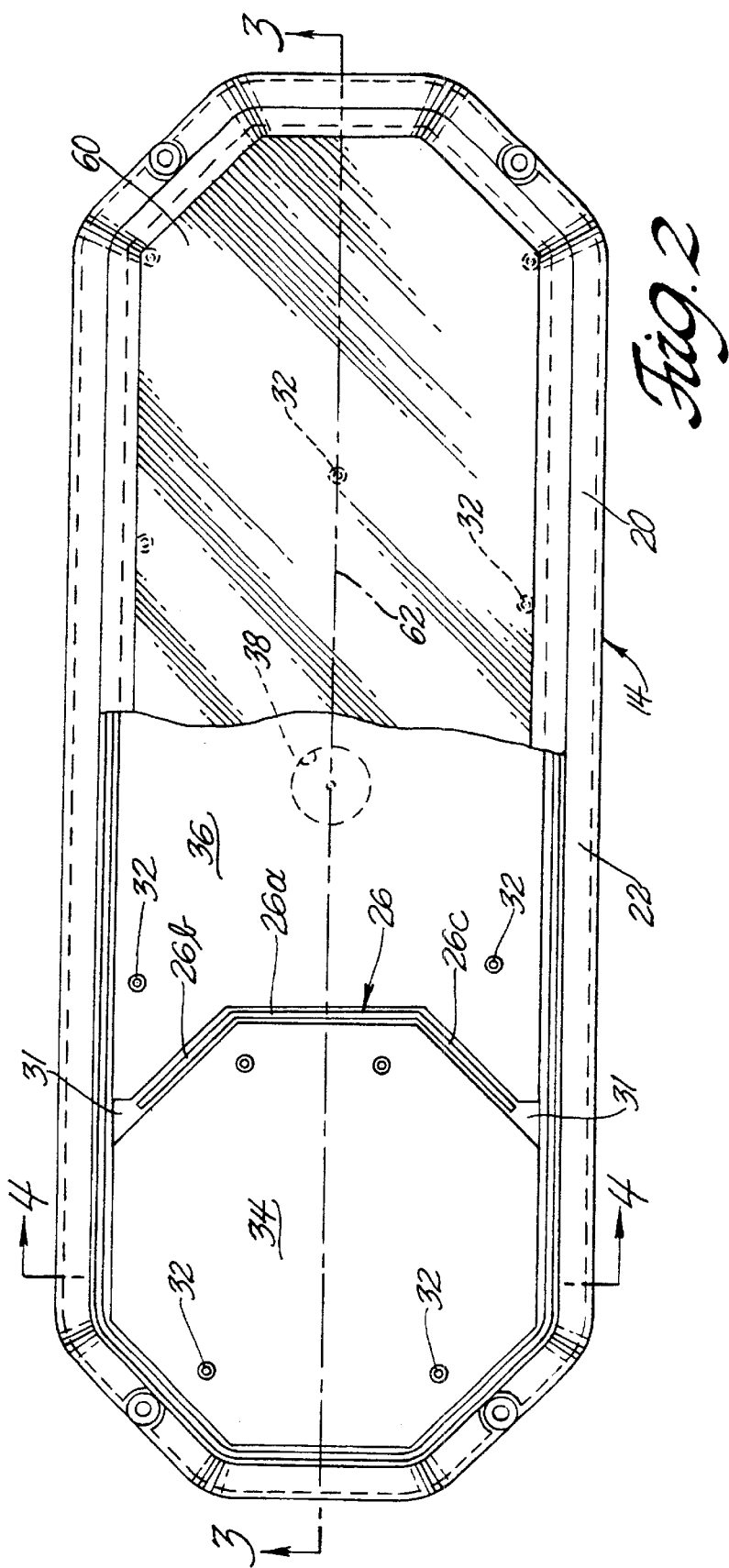
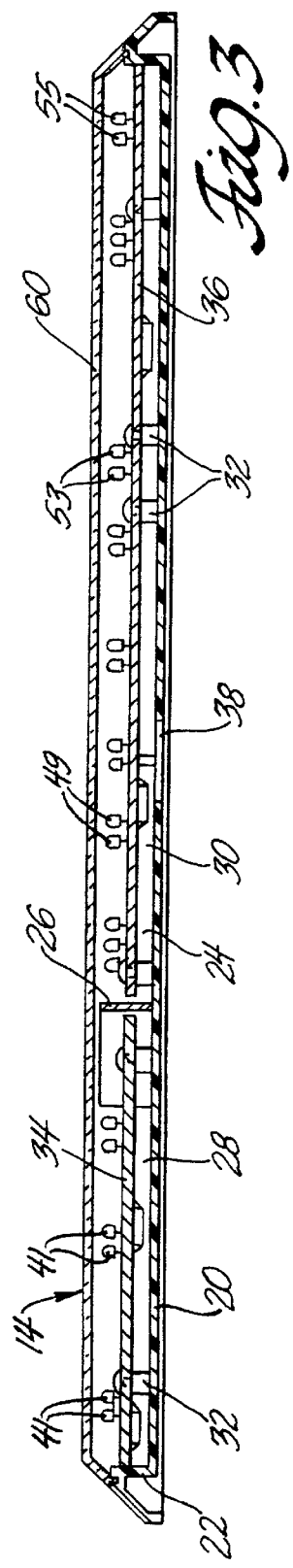

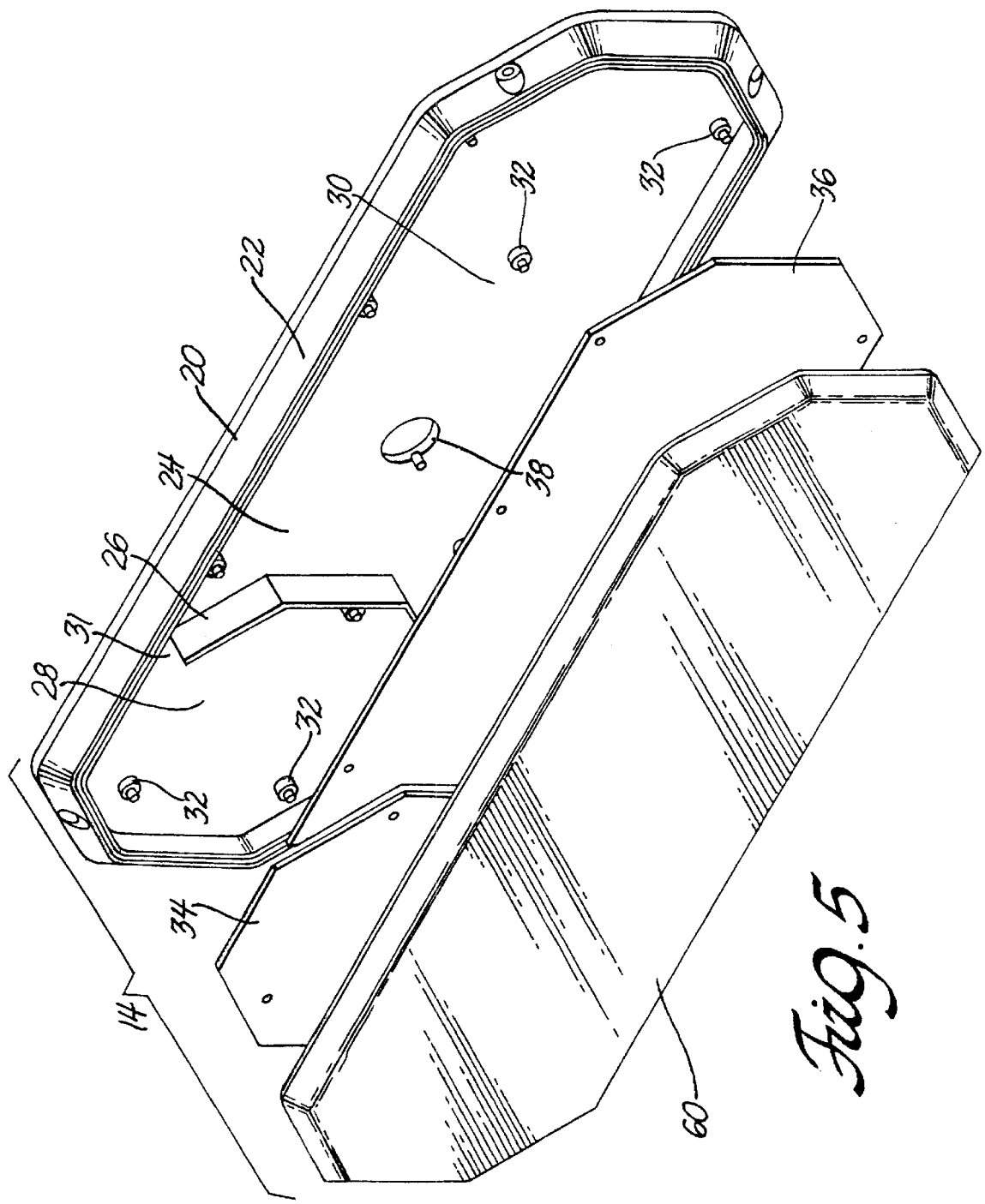

VEHICLE SIGNAL LIGHT ASSEMBLY

FIELD OF THE INVENTION

This invention relates to a vehicle signal light assembly and more particularly to a vehicle signal light assembly that conveys a plurality of messages to pedestrians and/or occupants of other vehicles.

BACKGROUND OF THE INVENTION

U.S. Pat. No. 5,604,480 granted to Ronald C. Lamparter Feb. 18, 1997 discloses a vehicle signal light assembly for a school bus that conveys two messages—a slowing-to-stop condition and a stop condition. The slowing-to-stop condition is conveyed by word messages of "CAUTION" and "STOPPING" in flashing light emitting diodes (LEDs) that alternate while the stop condition is conveyed in word messages of "DO NOT PASS" and "STOP" in flashing LEDs that alternate. The "STOP" message includes an octagonal array of flashing LEDs around the word "STOP" which is symbolic of a stop sign. The light assembly comprises a base that supports a circuit board having the LEDs that are arranged and selectively energized to convey the word and symbol messages. The LEDs are protected by a transparent cover that is attached to the base.

Inherent market conditions for such a vehicle signal light assembly curtail the potential for high production volumes and the benefits of economies of scale. Consequently there is a need for a vehicle signal light assembly having substantial versatility so as to increase the volume potential for the basic components of the vehicle signal light assembly and thus realize economics of scale in a partial way.

SUMMARY OF THE INVENTION

This invention provides a vehicle signal light assembly that has substantial versatility. The assembly comprises a housing base which supports at least two circuit boards and a transparent or translucent cover that protects the circuit boards. Each circuit board carries LEDs arranged to convey at least one message.

The assembly can convey a word or symbol message in a horizontal orientation while the assembly is easily adapted for installation in a variety of orientations including right hand and left hand orientations. Moreover one or more messages can be changed simply by changing a circuit board. The assembly preferably includes an octagonal circuit board disposed in an octagonal cavity so that a symbolic stop sign or other message can be oriented in several ways.

BRIEF DESCRIPTION OF THE DRAWINGS

FIG. 2 is an enlarged view of one vehicle signal light assembly of FIG. 1;

FIG. 3 is a section taken substantially along the line 3—3 of FIG. 2 looking in the direction of the arrows;

FIG. 5 is an exploded perspective view of the vehicle signal light assembly of FIG. 2 looking in the direction of the arrows;

DETAILED DESCRIPTION OF PREFERRED EMBODIMENT

Figure 1:
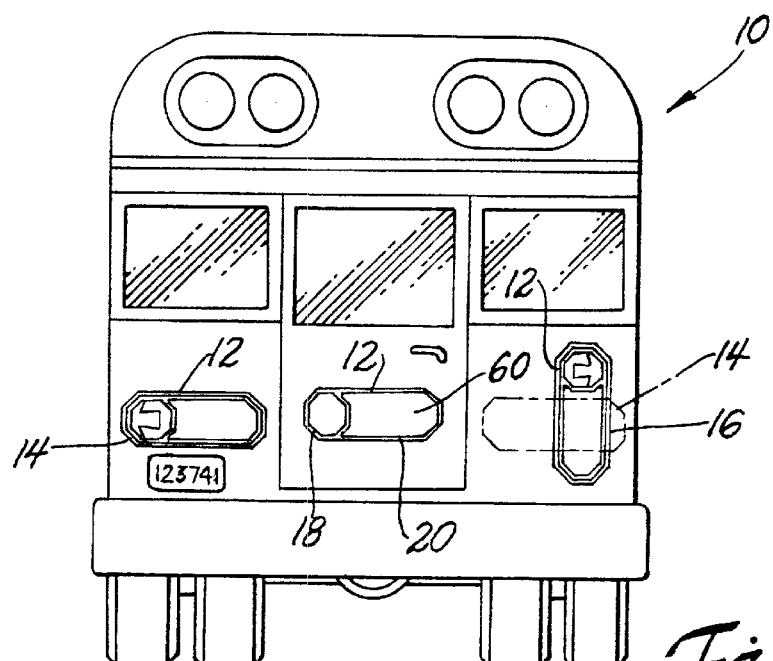
FIG. 1 is an end view of a passenger bus having three examples of a vehicle signal light assembly of the invention.

Referring now to the drawing, FIG. 1 shows the rear end of a school bus 10 that is equipped three examples of a vehicle signal light assembly 12 of the invention which are shown as a left hand tail light assembly 14, a right hand taillight assembly 16 and a central warning light assembly 18.

Tail light assembly 14 comprises a housing base 20 in the shape of an elongated octagon that has a perimeter wall 22 around an elongated octagonal cavity 24. Housing base 20 further includes a partition 26 in cavity 24 that outlines an end cavity portion 28 in conjunction with the nearer end portion of perimeter wall 22 with end cavity portion 28 being in the shape of a regular octagon. Partition 26 has a center section 26a that coincides with one side of the regular octagon and two end sections 26b and 26c that form two other sides of the regular octagon partially. The remaining cavity portion 30 is elongated and generally rectangular with a concave inner end and a convex outer end. The concave inner end of cavity portion 30 communicates with the end cavity portion 28 via passages 31 between perimeter wall 22 and end sections 26b and 26c.

The floor of the housing base 20 has a plurality of pedestals 32 for supporting circuit boards 34 and 36 and a hole 38 for wiring harnesses attached to the circuit boards (not shown) to exit from cavity 24. Circuit board 34 is octagonal and matches the shape of octagonal cavity 28 while circuit board 36 matches the irregular shape of the generally rectangular cavity 30.

Figure 6:
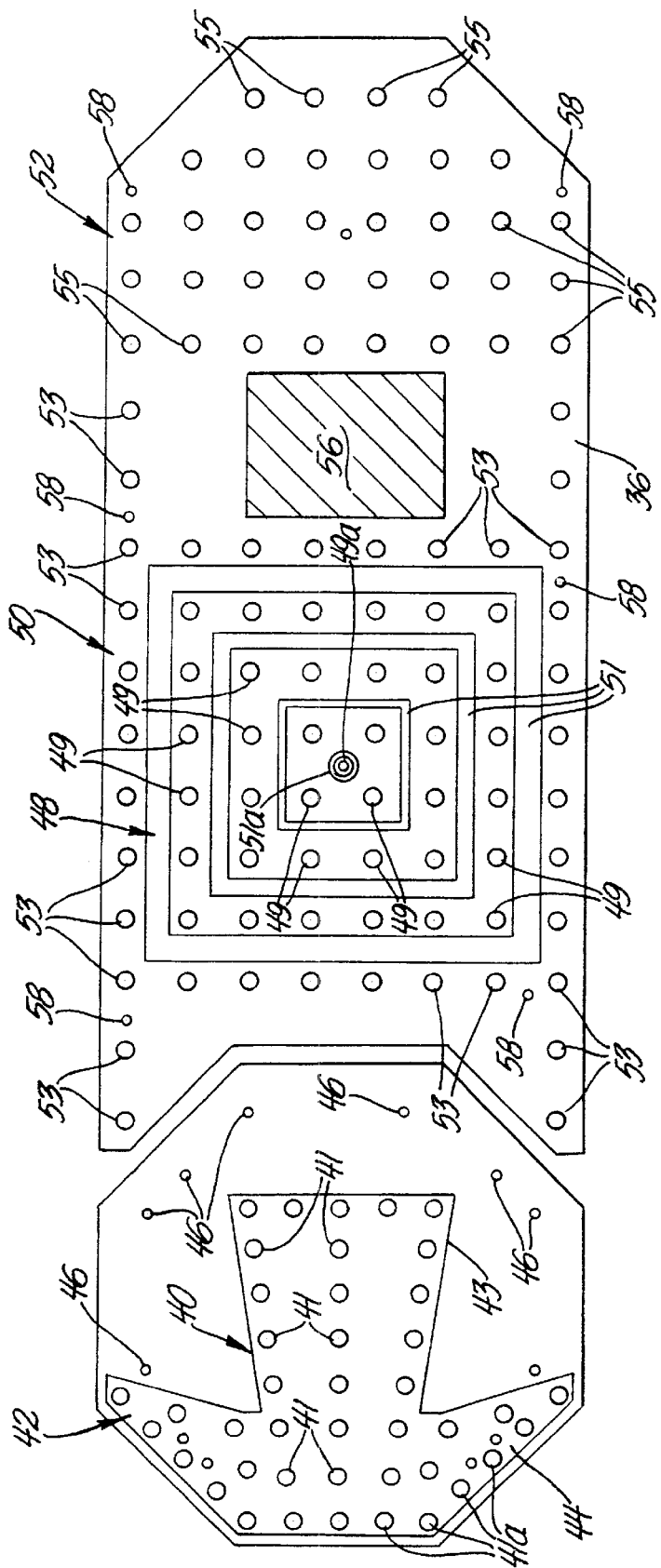
FIG. 6 is a plan view of the circuit boards in the vehicle signal light assembly of FIG. 2 showing the arrangement of the light emitting diodes.

Circuit board 34 has an array 40 of LEDs 41 arranged in the shape of an arrow 42 with the head 44 of the arrow having a leading row of LEDs 41a that parallels three consecutive sides of the octagonal circuit board 34 as best shown in FIG. 6. Circuit board 34 includes a plurality of mounting holes 46 for mounting the octagonal circuit board 34 in the octagonal cavity 28 on pedestals 32. Holes 46 receive the reduced ends of pedestals 32 which are then headed over to secure the circuit board 34 in place. LEDs 41 are preferably red or amber and controlled by a switch and flasher unit (not shown) in bus 10 that causes the arrow of LEDs 41 to flash to signal a left hand turn. Arrow 42 may have been an optional outline 43 printed on circuit board 34.

Circuit board 36 has three arrays 48, 50 and 52 of LEDs. Array 48 is a running light array that comprises a plurality of LEDs 49 arranged in three progressively larger boxes of LEDs 49 around a center LED 49a. Three boxes 51 of reflected red tape surround the progressively larger boxes of LEDs 49 respectively while a circle 51a of reflective red tape surrounds the center LED 49a. LEDs 49 and 49a are preferably red and controlled by a switch (not shown) in bus 10 that causes the LEDs 49 and 49a to light up and serve as running lights. The reflective red tape is an optional enhancement. LEDs 49 and 49a may also serve as a supplement to brake lights as explained below.

Array 50 is a brake light array that comprises a plurality of LEDs 53 arranged in a large box outside of the largest of the three boxes 51 of reflective red tape with the top and the bottom of the large box extended in wing like fashion. LEDs 53 are preferably red and controlled by the brake pedal (not shown) in bus 10 to light up and serve as a signal that the brakes are being applied. LEDs 53 are preferably energized at a higher voltage than LEDs 49 and 49a for increased brightness. For example LEDs 49 and 49a may be energized at 6 volts when serving as running lights while LEDs 53 may be energized at 12 volts to signal that the brakes are being applied. Moreover, LEDs 49 and 49a may be energized along with LEDs 53 at the higher voltage when the brakes are applied to supplement the brake light signal.

Array 52 is a back-up light array that comprises a plurality of LEDs 55 that fill out the outer end portion of circuit board 36. LEDs 55 are preferably white or colorless and controlled by the transmission setting (not shown) in bus 10 to light up and serve as back-up lights when the transmission is set in reverse to back-up the bus 10.

Arrays 40, 48, 50 and 52 which are illustrated in detail in FIG. 6 are omitted in FIGS. 2 and 5 for improved clarity.

Circuit board 36 also preferably includes an alarm, such as a horn 56 that is energized along with LEDs 55 to sound a warning that bus 10 is or is about to back-up. Circuit board 36 has a plurality of mounting holes 58 for mounting the circuit board 36 in cavity 30 on pedestals 32. Holes 58 receive the reduced ends of pedestals 32 which are then headed over to secure the circuit board 36 in place.

Circuit boards 34 and 36 each have a wire harness below the respective circuit boards (not shown) that lead out of cavity 24 via hole 38 with the wiring harness for circuit board 34 passing from end cavity portion 28 through either of passages 31 and then through cavity 30.

Figure 4:
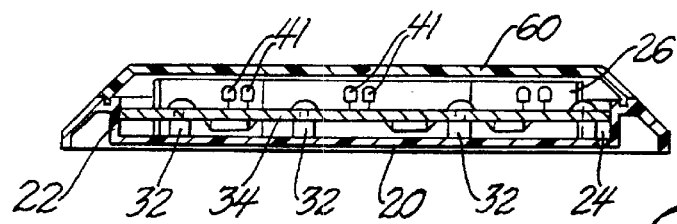
FIG. 4 is a section taken substantially along the line 4—4 of FIG. 2 looking in the direction of the arrows.

Tail light assembly 14 further includes a lens cover 60 that is attached to the perimeter wall 22 of the housing base 20 as best shown in FIGS. 3 and 4. As indicated above, LEDs 41, 49, 49a and 53 are preferably colored. On the other hand, lens cover 60 is preferably transparent or sufficiently translucent so that the colors of the LEDs show through the lens cover 60. This results in the lens cover 60 being the same for a wide variety of vehicle signal light assemblies as explained below.

Tail light assembly 14 is attached to bus 10 to serve as the horizontally oriented left hand tail light assembly as shown in FIG. 1. Tail light assembly 14 can also serve as a horizontally oriented right hand tail light assembly simply by rotating the tail light assembly 14 a half turn or 180 degrees in the plane of the paper as shown in dashed line in FIG. 1. This versatility is possible because housing base 20, circuit boards 34 and 36 and lens cover 60 are all symmetrical with respect to a longitudinal plane 62 bisecting these parts.

The right hand taillight assembly 16 is illustrated as a vertically oriented tail assembly in solid line in FIG. 1 of the invention to demonstrate the further versatility of the vehicle signal light assembly.

The vertically oriented right hand tail light assembly 16 consists of exactly the same parts as the horizontally oriented left hand tail light assembly 14. The only difference is that the octagonal circuit board 34 has been repositioned in octagonal cavity 28, that is the position of circuit board 34 in tail light assembly 16 is displaced 90 degrees clockwise from the position shown in FIG. 6. For a vertically oriented left hand tail light assembly, the circuit board 34 would be simply repositioned in cavity 28 so that it is displaced 90 degrees counterclockwise from the position shown in FIG. 6. In fact, circuit board 34 can be oriented in eight different positions in cavity 28 with the arrow 42 pointing in eight different directions which provides many design choices in positioning the tail light assembly on the rear end of bus 10 including four different slanting orientations at 45 degrees.

Figure 7:
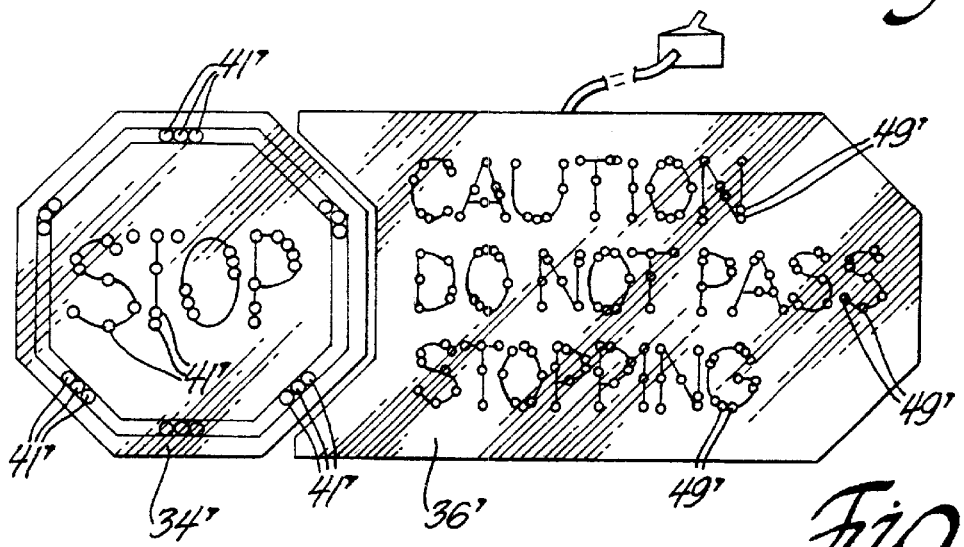
FIG. 7 is a plan view of the circuit boards in another vehicle signal light assembly shown in FIG. 1.

The warning light assembly 18 shown in FIGS. 1 and 7 consists of exactly the same housing base 20 and lens cover 60 as the tail light assemblies 14 and 16 with the only changes being the circuit boards. The circuit boards 34' and 36' for the signal light assembly 18 are shown in FIG. 7. In this assembly, circuit board 34' has a plurality of LEDs 41' arranged in a word message "STOP" inside an octagon of LEDs 41' while circuit board 36' has a plurality of LEDs 49' arranged in three word messages "CAUTION"; "DO NOT PASS" and "STOPPING" as in the case of the Lamparter patent discussed above. The signal light assembly 18, however, also has great versatility in that circuit board 34' with "STOP" inside an octagon of LEDs can also be placed in any one of eight orientations in cavity 28. Thus, circuit board 34' with the "STOP" message has the same versatility when used in conjunction with a second circuit board of signal lights as in the case of the tail light assemblies 14 and 16. However, a different second circuit board is needed if the second circuit board carries a word message as in the case of circuit board 36'.

While we have illustrated vehicle taillight and warning light assemblies, other vehicle signal light assemblies are also possible simply by changing one or both of the circuit boards. In other words, many modifications and variations of the present invention are possible in light of the above teachings. It is, therefore, to be understood that within the scope of the appended claims, the invention may be practiced otherwise than as specifically described.

We claim:

1. A vehicle signal light assembly comprising;
a housing base having a perimeter wall defining a cavity;
a partition within the perimeter wall defining a first cavity portion in the cavity in conjunction with a part of the perimeter wall and a second cavity portion in conjunction with another part of the perimeter wall,
a first circuit board disposed in the first cavity portion, the first circuit board having an array of LEDs arranged to convey at least one message,
a second circuit board disposed in the second cavity portion, the second circuit board having an array of LEDs arranged to convey at least one message,
a transparent or translucent lens cover attached to the housing base to protect the first and second circuit boards, and
the first circuit board being shaped to be disposed in the first cavity portion in at least two different orientations.

2. A vehicle signal light assembly comprising;
a housing base having a perimeter wall defining a cavity;
a partition within the perimeter wall defining a first cavity portion in the shape of a regular polygon in the cavity and a second cavity portion in conjunction with at least part of the perimeter wall,
a first circuit board disposed in the first cavity portion, the first circuit board being in the shape of the regular polygon and having an array of LEDs arranged to convey at least one message,
a second circuit board disposed in the second cavity portion, the second circuit board having an array of LEDs arranged to convey at least one message,
a transparent or translucent lens cover attached to the housing base to protect the first and second circuit boards, and
the first circuit board being shaped to be disposed in the first cavity portion in at least three different orientations.

3. The vehicle signal light assembly as defined in claim 2 wherein one of the circuit boards includes an audible alarm.

4. The vehicle signal light assembly as defined in claim 2 wherein the second circuit board includes an audible alarm.

5. A vehicle signal light assembly comprising;

a housing base having a perimeter wall defining a cavity;

a partition within the perimeter wall defining a end cavity portion in the shape of a regular polygon in the cavity in conjunction with an end portion of the perimeter wall and a second cavity portion in conjunction with at least part of the perimeter wall, a first circuit board disposed in the first cavity portion, the first circuit board being in the shape of the regular polygon and having an array of LEDs arranged to convey at least one message, a second circuit board disposed in the second cavity portion, the second circuit board having an array of LEDs arranged to convey at least one message, a transparent or translucent lens cover attached to the housing base to protect the first and second circuit boards, and the first circuit board being shaped to be disposed in the end cavity portion in at least three different orientations.

6. The vehicle signal light assembly as defined in claim 5 wherein the housing base, the lens cover and the array of LEDs on the first circuit board are all symmetrical to a longitudinal plane bisecting the housing base and the lens cover.

7. The vehicle signal light assembly as defined in claim 5 wherein the array of LEDs on the first circuit board include an arrow.

8. The vehicle signal light assembly as defined in claim 5 wherein the array of LEDs on the first circuit board include an octagon.

9. The vehicle signal light assembly as defined in claim 5 wherein the array of lights on the first circuit board include a word.

10. A vehicle signal light assembly comprising;

a housing base having a perimeter wall defining a cavity;

a partition within the perimeter wall defining a end cavity portion in the shape of a regular octagon in the cavity in conjunction with an end portion of the perimeter wall and a second cavity portion in conjunction with at least part of the perimeter wall, a first circuit board disposed in the first cavity portion, the first circuit board being in the shape of the regular octagon and having an array of LEDs arranged to convey at least one message, a second circuit board disposed in the second cavity portion, the second circuit board having an array of LEDs arranged to convey at least one message, a transparent or translucent lens cover attached to the housing base to protect the first and second circuit boards, and the first circuit board being shaped to be disposed in the end cavity portion in at least eight different orientations.

11. The vehicle signal light assembly as defined in claim 10 wherein the housing base, the lens cover and the array of LEDs on the first circuit board are all symmetrical to a longitudinal plane bisecting the housing base and the lens cover.

12. The vehicle signal light assembly as defined in claim 10 wherein the array of LEDs on the first circuit board include an arrow and the housing base, the lens cover, the array of LEDs on the first circuit board, and the array of LEDs on the second circuit board are all symmetrical to a longitudinal plane bisecting the housing base and the lens cover.

13. The vehicle signal light assembly as defined in claim 10 wherein the array of LEDs on the first circuit board include an octagon and the word STOP inside the octagon of LEDs.

* * * * *